Figure 1:
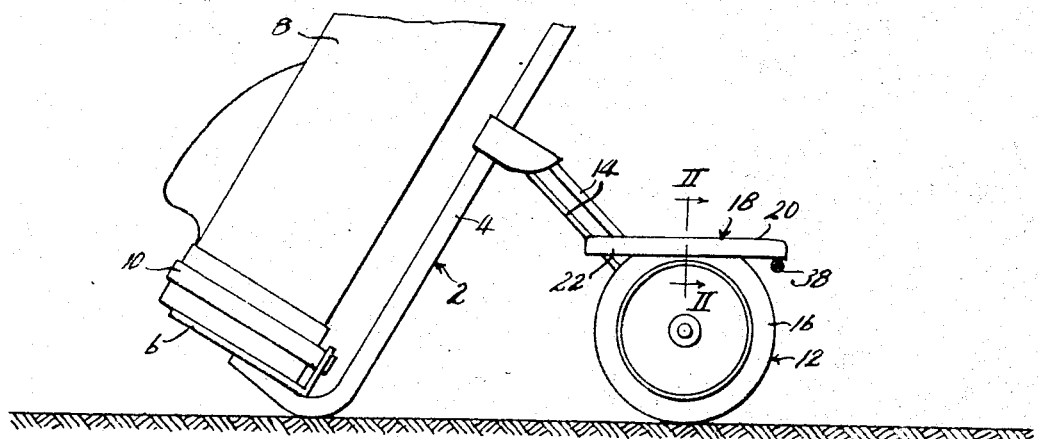

United States Patent

[11] 3,633,519

| [72] | Inventor | George D. Nichol<br>411 W. Washington St., Pittsfield, Ill. 62363 |
|---|---|---|
| [21] | Appl. No. | 6,728 |
| [22] | Filed | Jan. 29, 1970 |
| [45] | Patented | Jan. 11, 1972 |

[54] GOLF CART SEAT
1 Claim, 4 Drawing Figs.

[52] U.S. Cl............................................... 108/44,
108/47, 108/159, 280/DIG. 6, 280/165, 297/217, 280/29
[51] Int. Cl............................................... A47b 13/02
[50] Field of Search............................................ 280/30, 31,
47.19, 165, 47.41, 47.25, DIG. 6, 79.2, 79.1;
108/47, 44, 159; 297/217; 188/29, 176

[56] References Cited
UNITED STATES PATENTS

| 2,772,720 | 12/1956 | Zody et al.......... | 280/DIG. 6 |
| 2,610,072 | 9/1952 | Head.................. | 280/DIG. 6 |
| 2,897,974 | 8/1959 | Cook.................. | 108/44 UX |
| 3,189,364 | 6/1965 | Westphal............ | 280/DIG. 6 |
| 2,647,716 | 8/1953 | Hudziak et al..... | 108/47 X |

*Primary Examiner*—Benjamin Hersh
*Assistant Examiner*—John P. Silverstrim
*Attorney*—John A. Hamilton ABSTRACT: A golf cart seat consisting of a panel adapted to be rested on the top peripheral edge of a wheel of a golf cart whereby to serve as a seat for a golfer, said panel having a generally planar top surface and having members on its lower surface forming a centered, generally rectangular recess for engaging over said wheel, whereby to keep said seat panel balanced on said wheel, and whereby to prevent said wheel from rolling along the ground, even if the ground should be sloping, as a result of the user's weight.

PATENTED JAN 11 1972

3,633,519

INVENTOR.
George D. Nichol
BY John A. Hamilton
Attorney.

GOLF CART SEAT

This invention relates to new and useful improvements in golfing accessories, and has particular reference to a seat device for use in connection with a common hand-propelled golf cart.

Hand-propelled golf carts, consisting of a wheeled frame having a handle and adapted to carry a golf club bag and other golfing equipment thereon, are of course in extremely wide usage, but do not provide seats on which the golfer can sit to rest or wait when desired, and it would be impractical to do so, since the frames thereof are commonly of lightweight construction for ease of propulsion, and therefore do not have sufficient strength to support the weight of the golfer himself. On the other hand, such a seat would be highly desirable, since golfers must often wait their turns, allow other parties to play through, or may simply desire to rest.

Accordingly, the principal object of the present invention is the provision of a golf cart seat which can be carried by and used in connection with a golf cart, but which does not rely on the relatively fragile frame of the cart for its support. To this end, the seat consists of a generally planar panel adapted to be rested horizontally on the upper peripheral edge of one of the wheels of the cart. Said wheels do not have the structural weakness of the cart frame, being easily capable of supporting the weight of even a heavy man directly thereon.

Another object is the provision of means for keeping the seat panel neatly centered and solidly supported on the arcuate edge of the cart wheel, and also for securely restraining the wheel against rolling along the ground, so that the cart cannot move, nor the wheel roll "out" from under the panel. Generally, this is accomplished by forming the lower surface of the panel to constitute a downwardly opening recess therein adapted to fit over the top portion of the wheel, the portions of the panel forming said recess including members operable to be pressed into indenting relation to the wheel tire by the weight of a person sitting on the panel.

A still further object is the provision of a golf cart seat of the character described having means whereby it may readily be adapted for us with golf cart wheels having different diameters, or different thicknesses transversely to their planes.

Other objects are simplicity and economy of construction, constituting a unitary structure which may have no moving parts, and efficiency and dependability of operation.

Figures 2, 3:
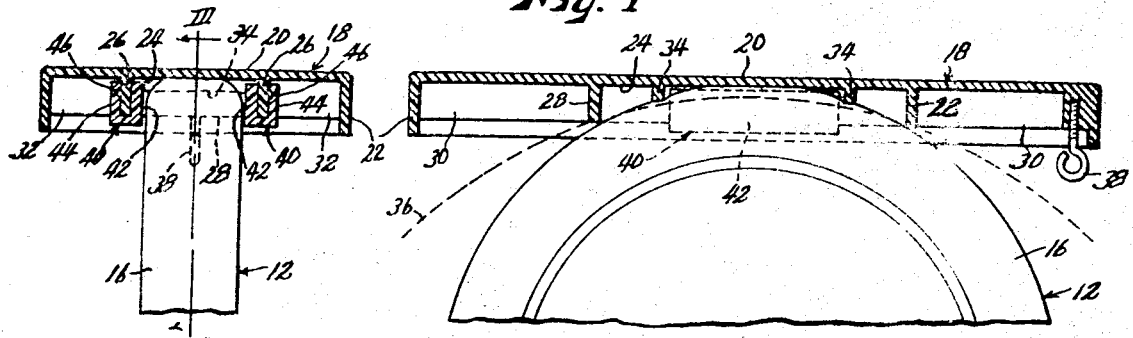
Figure 4:
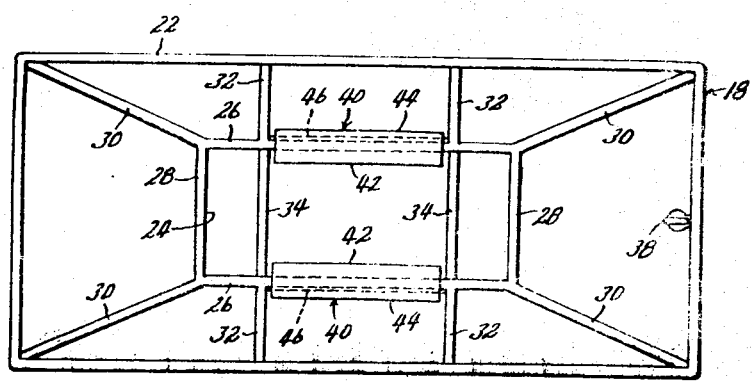

With these objects in view, as well as other objects which will appear in the course of the specification, reference will be had to the accompanying drawing wherein:

FIG. 1 is a fragmentary side elevational view of a golf cart, with a golf cart seat embodying the present invention mounted operatively on a wheel thereof, FIG. 3 is an enlarged, fragmentary sectional view taken on line II—II of FIG. 1, with the golf cart wheel left in elevation, FIG. 3 is a sectional view taken on line III—III of FIG. 2, with the golf cart wheel left in elevation, and FIG. 4 is an inverted plan view of the golf cart seat to the same scale as in FIG. 2 and 3.

Like reference numerals apply to similar parts throughout the several views, and the numeral 2 applies generally to a golf cart of common design, shown fragmentarily, having a frame including an inclined standard 4 carrying at its lower end a platform 6 on which the lower end of a golf bag 8 is supported, and secured by any suitable means such as strap 10, the upper end of the bag being also secured to standard 4 by any suitable means, not shown. The frame is supported by a pair of wheels 12 (one shown), each connected to standard 4 by arms 14, said arms usually being foldable whereby to permit disposition of the wheels closely adjacent said standard for convenience of storage in automobile trunks or the like. In use position, said wheels are laterally offset from standard 4, in coaxial relation, and the airspace above said wheels is substantially unobstructed. The lower end of standard 4 may engage the ground as shown in FIG. 1 to provide a stable three-point support for the cart when at rest, and may be elevated above the ground by tilting the frame rearwardly on the axis of wheels 12, whereby the cart may be wheeled freely along the ground. Each of wheels 12 is normally provided with a tire 16 of rubber or the like, and is of course normally disposed in a vertical plane.

The golf cart seat 18 forming the subject matter of the present invention includes a generally rectangular panel 20 formed of a heavy strong plastic or other suitable material, the upper surface of said panel being planar, although it preferably is somewhat roughened to provide a nonslip engagement with the clothing of the user. Said panel is provided around its entire periphery with a depending, integral flange 22, and also with depending walls forming a downwardly opening rectangular recess 24 on the lower surface thereof, walls 26 forming the longer sides of said recess and walls 28 forming the shorter ends of the recess. Recess 24 is centered with respect to panel 20, and its major axis coincides with the major axis of said panel. Walls 26 and 28 forming recess 24 are reinforced by integral webs 30 extending diagonally from each corner of recess 24 to the corresponding corner of flange 22, and by webs 32 extending between intermediate points of walls 26 and flange 22. Disposed intermediate end walls 28 of recess 24, and parallel to said walls, are an additional pair of depending integral walls 34, walls 34 depending from panel 20 to a lesser degree than walls 28.

In use, the seat panel is simply positioned horizontally above one of cart wheels 12, with the major axis of recess 24 in the vertical plane of the wheel, and rested on said wheel with the tire 16 of said wheel engaged in said recess, as best shown in FIGS. 2 and 3, and a person may then sit thereon. The wheel is ordinarily sufficiently large in diameter, usually at least 10 or 12 inches, to dispose the seat panel at an elevation above the ground to provide adequate comfort for the user. Also, for several reasons, it is not difficult for the user to maintain his balance on the seat, despite the necessarily small support base of said seat when carried on a cart wheel as shown. For one thing, as long as the user's feet are on the ground, as they necessarily are, he uses his feet to stabilize himself on the seat, and also it has been found that he will shift his hips on the seat, as may be necessary to maintain balance, automatically and instinctively without necessity of practice or special instructions. For another thing, the panel is always maintained centered over the wheel by the engagement of the wheel in recess 24, and depending walls 28 or 34 engage the periphery of the wheel to provide a relatively broad support base for the panel against tilting in the plane of the wheel, not merely a point support. The support width thus obtained is of course dependent on the diameter of the wheel and the permissible thickness of the seat structure, a thin structure as shown being generally preferable. A smaller wheel, such as wheel 12, engages only walls 34, not walls 28, while a larger wheel, the periphery of which is indicated by dotted line 36 in FIG. 3, may engage walls 28 but not walls 34. Other wall pairs, such as pair 28 and pair 34, could be provided at different spacings to accommodate the seat to wheels of different diameters. It is highly desirable that the wheel tire be solidly engaged by such a pair of walls, and not be capable of "rolling" therebetween, since such rolling results not only in longitudinal shifting of the seat, but also rolling of the wheel on the ground, and such movements, even though slight, contribute to a sense of insecurity and imbalance in the user. Of course, if the seat were vertically deeper than shown, walls 26 and 28 could depend further, and hence be spaced more widely apart to engage lower points of the wheel periphery, but a thin panel is preferred since it can be carried and stored far more easily than a thicker one. The seat as shown is provided at one end with an eye member 58 whereby it can be conveniently hung on some portion of the cart frame when not in use.

The seat could also tilt transversely to the plane of the wheel, and also slip transversely on the wheel, if the spacing between side recess walls 26 did not correspond to the lateral thickness of tire 16. Such tilting is minimized by the fact that the tire often has a relatively broad, flat surface, but any such lateral slippage is objectionable, since it is likely to occur quite suddenly in many cases, and tends to throw the user off balance. It is also true that cart wheels in common usage are of widely different widths, and that walls 26 must be spaced apart sufficiently to receive therebetween the thickest wheels likely to be encountered. To prevent such lateral slippage in the event the wheel thickness is substantially less than the spacing between walls 26, there are provided a pair of adapters 40 each consisting of a U-shaped channel, formed of plastic or the like, adapted to be fitted snugly over the lower edge of one of walls 26 of recess 24. One leg 42 of the adapter is thus disposed at the inner surface of wall 26 within recess 24, and the other leg 44 of the adapter is disposed at the outer surface of wall 26. The adapter is resilient, and is held releasably in position by the engagement of a rib 46 on the external surface of wall 26 in a matching groove formed therefor in adapter leg 44, as shown. Adapter legs 42 thus effectively narrow the width of recess 24 and by the selection of adapters having legs 42 of the proper thickness the seat can be adapted for use with cart wheels of different thickness.

It will be seen also that so long as a person is sitting on the seat, it is extremely unlikely that the cart wheel can roll, and is effectively locked against rotation, so that it cannot roll "out from under" the seat to displace the user, and the cart itself cannot roll but is effectively held stationary, even if it may be resting on sloping ground. This locking action results partially from the fact that the wheel projects upwardly into recess 24, so that as long as the wheel cannot turn by rotary slippage within said recess, it cannot roll on the ground without vertically elevating the seat, and also the weight of the user, by an amount equal to the vertical depth of the recess. It would require a very steep hill indeed for gravity to exert this degree of turning torque on the wheel, so the wheel remains stationary. Of course rolling of the wheel on the ground could still occur if said wheel should slip peripherally within recess 24. Such slippage would be unlikely even if said recess had a smooth surface engaging the wheel with a uniform loading, since the rubber of the tire normally has a good nonslip purchase on the seat material. However, in the present structure, any remote chance of such slippage is further reduced by the fact that the tire is engaged by the sharp angular edges of seat walls 28 or 34, as the case may be, and these wall edges are pressed into indenting relationship to the tire, as shown. Any possibility of rotary slippage of the wheel in recess 24 is thus reduced to a virtual impossibility.

While I have shown and described a specific embodiment of my invention, it will be readily apparent that many minor changes of structure and operation could be made without departing from the spirit of the invention.

What I claim as new and desire to protect by Letters Patent is:

1. A golf cart seat for use in combination with a golf cart including one or more ground-engaging wheels, said seat comprising:
   a. a rigid panel adapted to be disposed horizontally over one of said wheels and having depending planar walls affixed to the lower surface thereof and defining a downwardly opening rectangular recess centered with respect to said panel and adapted to receive the upper edge portion of said wheel therein with its major axis in the plane of said wheel, said recess being of such longitudinal length and so configurated that the walls defining the end limits of said recess are pressed into intimate engagement with the curved periphery of said wheel when said seat is positioned as recited and a person sits thereon, and
   b. adapter members adapted to be attached to said seat and operable to vary the effective transverse width of said recess, whereby to adapt said seat for use on wheels having different thicknesses transverse to the planes thereof, said adapter members constituting a pair of U-shaped channels adapted to be engaged respectively over the lower edges of the walls defining the longer edges of said recess.

* * * * *